(12) United States Patent
Deschamps (10) Patent No.: US 10,246,801 B2
(45) Date of Patent: Apr. 2, 2019

(54) METHOD AND MACHINE FOR PRODUCING A WOVEN STRUCTURE

(71) Applicant: ETS A. DESCHAMPS ET FILS, La Couronne (FR)

(72) Inventor: Georges-Paul Deschamps, Voeuil et Giget (FR)

(73) Assignee: ETS A. DESCHAMPS ET FILS, La Couronne (FR)

(*) Notice: Subject to any disclaimer, the term of this patent is extended or adjusted under 35 U.S.C. 154(b) by 0 days.

(21) Appl. No.: 15/208,821

(22) Filed: Jul. 13, 2016

(65) Prior Publication Data

US 2017/0016154 A1 Jan. 19, 2017

(30) Foreign Application Priority Data

Jul. 13, 2015 (FR) .................................. 15 56657

(51) Int. Cl.
*D03D 3/02* (2006.01)
*D03D 1/00* (2006.01)
(Continued)

(52) U.S. Cl.
CPC ............ *D03D 3/02* (2013.01); *A01K 61/55* (2017.01); *D03D 1/0088* (2013.01); *D03D 1/04* (2013.01);
(Continued)

(58) Field of Classification Search
CPC .... A41D 13/1281; A41D 1/002; A41D 1/005; A41D 2400/32; A41D 13/0051;
(Continued)

(56) References Cited

U.S. PATENT DOCUMENTS

| 3,795,288 A | * | 3/1974 | Pall ...................... B01D 39/12 181/224 |
| 5,713,303 A | * | 2/1998 | Willinsky .............. A01K 61/17 119/218 |

(Continued)

FOREIGN PATENT DOCUMENTS

| FR | 842050 | 6/1939 |
| WO | 2005/06211 A1 | 7/2005 |

(Continued)

*Primary Examiner* — Bobby Muromoto, Jr.
(74) *Attorney, Agent, or Firm* — Young & Thompson (57) ABSTRACT

A method is provided that includes: weaving one first portion including warp and weft threads intertwined according to the fundamental weave of each portion of woven wall corresponding to this first portion, stopping introduction of weft threads after insertion of a weft thread associated with the positioning of one elongated element having a main axis, the weft thread being intertwined with the warp threads of each portion of woven wall, introducing each elongated element between the warp threads defining with the associated weft thread, the insertion position of this elongated element, and maintaining in position each elongated element and introducing one new weft thread intertwining warp threads of the structure according to the fundamental weave of each wall portion or according to at least one new weave, to resume production of the structure, with each elongated element not being taken in the structure.

22 Claims, 3 Drawing Sheets

(51) Int. Cl.
  *D03D 13/00* (2006.01)
  *D03D 15/02* (2006.01)
  *D03D 1/04* (2006.01)
  *A01K 61/55* (2017.01)
  *D03D 3/00* (2006.01)

(52) U.S. Cl.
  CPC .............. *D03D 13/00* (2013.01); *D03D 15/02* (2013.01); *D10B 2101/20* (2013.01); *D10B 2507/02* (2013.01); *Y02A 40/822* (2018.01)

(58) Field of Classification Search
  CPC .. A41D 13/1236; A41D 27/205; G06F 1/163; G06F 3/011; G06F 3/017; G06F 1/16; G06F 19/3418; G06F 19/3481; G06F 1/00; G06F 2203/04103; G06F 2203/04112; G06F 3/016; G06F 15/00; G06F 19/32; G06F 19/3431; D10B 2403/02431; D10B 2101/20; D10B 2509/00; D10B 2401/18; D03D 11/00; D03D 25/005; D03D 23/00; D03D 41/00; D03D 13/00; D03D 15/00; D03D 1/0088; D03D 11/02; D03D 15/02; D03D 3/02
  See application file for complete search history.

(56) References Cited

U.S. PATENT DOCUMENTS

| | | | | |
|---|---|---|---|---|
| 5,846,890 A * | 12/1998 | Deschamps | ............ | D03D 23/00 139/384 R |
| 6,696,122 B1 * | 2/2004 | Deschamps | ............ | D03D 11/02 180/9 |
| 6,773,426 B2 * | 8/2004 | Tamari | ................ | A61M 1/3621 128/DIG. 3 |
| 8,308,489 B2 * | 11/2012 | Lee | .................... | H01R 13/2407 2/69 |
| 8,627,855 B2 * | 1/2014 | Deschamps | ............ | D03D 11/00 139/11 |
| 8,871,659 B2 * | 10/2014 | Deschamps | ............ | D03D 23/00 442/182 |
| 8,950,440 B2 * | 2/2015 | Deschamps | ............ | D03D 11/00 139/11 |
| 9,416,470 B2 * | 8/2016 | Shoshani | .................. | D04B 1/18 |
| 9,582,072 B2 * | 2/2017 | Connor | .................... | G06F 3/011 |
| 9,588,582 B2 * | 3/2017 | Connor | ................ | A61B 5/1126 |
| 9,597,567 B1 * | 3/2017 | Tran | ........................ | A63B 60/46 |
| 9,598,799 B2 * | 3/2017 | Shoshani | .................. | D04B 1/18 |
| 2003/0034083 A1 * | 2/2003 | Glenn | .................... | A41B 17/00 139/387 R |
| 2008/0143080 A1 * | 6/2008 | Burr | ........................ | D04B 1/14 280/495 |
| 2010/0282360 A1 * | 11/2010 | Deschamps | ............ | D03D 23/00 139/420 A |
| 2010/0327243 A1 * | 12/2010 | Deschamps | ............ | D03D 1/02 254/93 HP |
| 2011/0036446 A1 * | 2/2011 | Deschamps | ............ | D03D 11/00 139/11 |
| 2011/0067454 A1 * | 3/2011 | Burr | ........................ | D04B 1/14 66/171 |
| 2011/0123643 A1 * | 5/2011 | Biersteker | ............ | A01K 69/08 424/641 |
| 2012/0274554 A1 * | 11/2012 | Kinoshita | .................. | A61B 5/1118 345/156 |
| 2012/0280902 A1 * | 11/2012 | Persaud | ................ | A63F 13/212 345/156 |
| 2012/0316406 A1 * | 12/2012 | Rahman | ............... | G01C 22/006 600/301 |
| 2012/0323501 A1 * | 12/2012 | Sarrafzadeh | ............ | G01L 1/18 702/41 |
| 2013/0072765 A1 * | 3/2013 | Kahn | ........................ | A61B 5/01 600/301 |
| 2013/0110011 A1 * | 5/2013 | McGregor | ............ | A61B 5/1118 600/595 |
| 2013/0156816 A1 * | 6/2013 | Stobbs | ................ | A61K 31/045 424/400 |
| 2013/0176737 A1 * | 7/2013 | Zhou | ........................ | H05K 1/038 362/249.06 |
| 2013/0229338 A1 * | 9/2013 | Sohn | ........................ | G06F 3/011 345/156 |
| 2013/0275057 A1 * | 10/2013 | Perlin | .................... | G06F 3/0414 702/41 |
| 2013/0328783 A1 * | 12/2013 | Martin | .................. | G09G 5/006 345/169 |
| 2014/0014222 A1 * | 1/2014 | Deschamps | ............ | D03D 11/00 139/11 |
| 2014/0070957 A1 * | 3/2014 | Longinotti-Buitoni | ............. | A61B 5/6804 340/870.01 |
| 2014/0088764 A1 * | 3/2014 | Naidu | .................. | H03K 17/962 700/258 |
| 2014/0135608 A1 * | 5/2014 | Gazzoni | .................. | A61N 1/04 600/395 |
| 2014/0275906 A1 * | 9/2014 | Hackenburg | .......... | A61M 5/142 600/365 |
| 2014/0343390 A1 * | 11/2014 | Berzowska | ............ | H05K 1/038 600/388 |
| 2015/0075303 A1 * | 3/2015 | Connor | ................ | A61B 5/1126 73/865.4 |
| 2015/0194795 A1 * | 7/2015 | Rohr | ........................ | H01R 9/032 174/72 A |
| 2015/0223435 A1 * | 8/2015 | Kojima | ................ | A01K 61/002 119/236 |
| 2015/0297135 A1 * | 10/2015 | Shoshani | ............ | A61B 5/0408 600/388 |
| 2015/0305676 A1 * | 10/2015 | Shoshani | ............ | A61B 5/0408 600/388 |
| 2015/0309563 A1 * | 10/2015 | Connor | .................... | G06F 3/011 73/865.4 |
| 2015/0366504 A1 * | 12/2015 | Connor | ................ | A61B 5/6804 600/301 |
| 2016/0002834 A1 * | 1/2016 | Shoshani | ................ | D04B 1/18 66/176 |
| 2016/0062333 A1 * | 3/2016 | Jayaraman | ............ | G08C 17/02 700/11 |
| 2016/0076174 A1 * | 3/2016 | Sakaue | .................. | D03D 23/00 139/422 |
| 2016/0202755 A1 * | 7/2016 | Connor | ................ | A61B 5/1126 73/865.4 |
| 2016/0287528 A1 * | 10/2016 | Stobbs | ................ | A61K 31/045 |
| 2016/0310076 A1 * | 10/2016 | Shoshani | ................ | D04B 1/18 |
| 2016/0338644 A1 * | 11/2016 | Connor | ................ | A41D 1/002 |
| 2017/0014073 A1 * | 1/2017 | Shoshani | ............ | A41D 13/1281 |
| 2017/0150760 A1 * | 6/2017 | Yue | ........................ | A41D 13/0051 |

FOREIGN PATENT DOCUMENTS

| | | |
|---|---|---|
| WO | 2007/050111 A2 | 5/2007 |
| WO | 2013/000736 A1 | 1/2013 |
| WO | 2014/138742 A1 | 9/2014 |

\* cited by examiner

METHOD AND MACHINE FOR PRODUCING A WOVEN STRUCTURE

BACKGROUND OF THE INVENTION

Field of the Invention

This invention relates to a method for producing an improved woven structure such as a piece of smart clothing, a Japanese lantern net or a hollow duct for the transport of fluid.

It also relates to an improved weaving loom for the carrying out of such a woven structure.

Technological Background

Various devices for farming molluscs in the open sea and in particular oysters are known, which are also called "Japanese lanterns" due to their resemblance with such an object.

Such devices for farming have been known for thousands of years and their origin is in countries with a low tidal range, or even a zero tidal range such as for example, the Mediterranean basin or certain countries of Asia.

The seashell are no longer strewn but placed on circular plates arranged inside a net having the general shape of a tube, with these plates being regularly spaced in this net. A central tether makes it possible to fasten these plates by maintaining them regularly spaced apart from each other.

This net is therefore permeable in order to allow for the circulation of sea water and to as such allow the seashell to capture the particles required for their food and their growth.

These nets are as such left in the sea water so that the seashell prosper. As these nets are detected, they are then taken out of the water in order to recover the seashell.

To date, these devices for farming comprise generally about ten (10) to twelve (12) plates with openwork and connected together by pieces of rope, with the whole being received in a net that has the shape of a tube which confines the seashell.

Often an opening/closing system of the "velcro" type makes it possible to open and close the net over its entire height in order to allow access to the plates for the purpose of emptying and reloading them.

Each device for farming is therefore withdrawn from the water and brought back to land for the carrying out of these operations or the latter are carried out directly aboard the boat, which requires a boat of large size in order to allow for the manipulation and the work on each device.

The devices for farming of the prior art have many disadvantages:
- as these devices are of a single piece, it is necessary to recover them in order to bring them back to land or store them on a large deck surface for the purpose of processing them.
- the processing time is very substantial because it requires either a return trip back to land, or an immobilisation of the boat, which is always expensive, for processing at sea that is always more dangerous and difficult.
- the assembly of the net and of the plates that it surrounds, is complex. It is therefore tedious and long to release the plates from this net in order to access the seashell. It is also difficult to process only a portion of these plates.
- the net is of very low quality and is considered to be a consumable item, therefore able to be discarded after one or two uses without any recycling process being set up.

There is therefore a pressing need for a device for farming seashell of which the original design authorises facilitated emptying/reloading operations, even at sea in situ, i.e. without completely removing the device for farming.

It is, moreover, well known that the introduction of an external element into a fabric, for example a point, can locally deteriorate this fabric, for example through the appearance of threads of the fabric that are damaged, or even cut.

A localised weakening of the mechanical resistance of a fabric is therefore observed after the introduction of an external element into the latter.

However, such a weakening can be the point of departure of a tear in this fabric in particular conditions.

Moreover, the introduction by force of such an external element into the fabric, excludes any possibility of inserting a fragile object into the fabric, which would then be likely to be damaged, or even destroyed.

In order to improve the device for farming seashell, and in particular its net, this Applicant, specialist in the field of weaving, has therefore observed the absence of a solution in prior art and the need for an innovative method of weaving.

Object of the Invention

This invention aims to overcome the disadvantages of prior art by proposing a method for weaving a woven structure, simple in its design and in its operating mode, rapid and economical, that allows for a facilitated introduction of one or several external elements into this woven structure without weakening its mechanical resistance.

Another object of this invention is a method for weaving a woven structure that allows for the insertion of fragile objects into a woven structure without deteriorating these objects.

Yet another object of this invention is a method for weaving such a woven structure that authorises a very precise and simple positioning of an external object in this structure.

This invention also relates to a weaving loom for the implementing of such a method for weaving a woven structure.

This invention further relates to a device for farming seashell, of which the net is at least partially obtained by such a method of weaving, drastically simplifying the emptying/reloading operations of the plates of the device for farming.

BRIEF DESCRIPTION OF THE INVENTION

To this effect, the invention relates to a method for producing a woven structure comprising at least one woven wall, wherein the following steps are carried out:

a) weaving at least one first portion of said woven structure, said first portion comprising warp threads and weft threads crossed over each other, or intertwined, according to the fundamental weave of each portion of woven wall corresponding to this first portion, b) stopping the introduction of the weft threads after the insertion of a weft thread associated with the positioning of at least one elongated element in said woven structure, with this weft thread being intertwined with the warp threads of each portion of woven wall according to the fundamental weave of said portion of wall, c) said at least one elongated element having a main axis, introducing each elongated element between the warp threads defining with the associated said weft thread, the position of insertion of this elongated element into the woven structure, with the main axis of said elongated element cutting the plane passing through the warp threads of each portion of wall into which it is introduced, d) maintaining in position each elongated element and introducing at least one new weft thread intertwining the warp threads of said woven structure according to said fundamental weave of each portion of wall or according to at least one new weave, in order to resume the production of said woven structure, with each elongated element not being taken in said woven structure.

When then woven structure comprises several walls, the wall portions can have the same fundamental weave or on the contrary separate weaves for at least some of them.

In a known manner, those skilled in the art know that to represent "the weave" of a fabric, use is made of the method known as producing a weave diagram, which uses a paper with grid pattern, and, by definition, it is admitted that the vertical interlines of the grid pattern show the warp threads, and the horizontal interlines, the weft threads, or pick of the fabric.

If, on such a grid pattern, it is desired to show that a warp thread moves over a weft thread, it is then sufficient, by convention, to colour the box, or square, placed at the intersection of the warp thread and of the weft thread under consideration. This is referred to as a "taken", also known as a "riser".

The absence of colouration of a box, which corresponds to a "left", also known as a "sinker", symbolises the passing of the warp thread under the corresponding weft thread.

This weave diagramming method, particularly simple, as such makes it possible via a judicious combination of "takens" and "lefts", to represent all the respective movements of the warp threads and of the weft threads of a woven wall or of a fabric, as complicated as they may be.

As the term "taken" of the step d) of the method must be interpreted with this meaning, it is clear from the technical definition of the method that each elongated element introduced into the woven structure is naturally not linked to this woven structure by only the weaving of the woven structure. As such, and in the absence of an attaching step separate from the weaving of the woven structure properly speaking, such a gluing of the elongated element to the warp and weft threads surrounding it, each elongated element can be withdrawn from the woven structure.

Of course, this operation can be made more or less complex according to the compaction of the weft threads of the woven structure desired, which can result in a more or less substantial tightening of the elongated element.

The woven walls, or layers, of the woven structure can be identical or, on the contrary, have for at least some of them, different dimensions or shapes.

The stopping of the weaving in order to introduce one or several elongated elements into the woven structure is therefore detected with respect to the weft thread directly associated with the position of the or of these elongated elements in the woven structure. This means that this weft thread is one of the threads of the woven structure surrounding the elongated element or elements. Of course, the steps b) to d) are repeated each time that one or several new elongated elements, of which the position or positions are associated with another weft thread of the woven structure, are to be introduced into this woven structure. These operations therefore require determining beforehand what the weft thread is, or what the weft threads are, of the woven structure associated with the positioning of one or several elongated elements in this structure. A monitoring of the guiding and of the introducing of these weft threads into each channel of the weaving loom is also necessary in order to trigger the stopping of the weaving. However, such a method allows for very precise positioning, as it is to the nearest wire, of an elongated element in the woven structure without mechanically weakening the latter.

The elongated element has a main axis that extends along its longitudinal dimension and, by way of example, the elongated element is a solid thread, a metal thread, an insert, a stiffening rod, a tube, a tube provided with at least one cross-flow sealing membrane, a tube of which the inner wall is tapped and combinations of these elements.

Advantageously, this elongated element is of ovoid or circular straight cross-section.

Two sealing membranes placed within a tube can make it possible to define a sealed housing in order to protect the external object placed in said tube, for example from water.

When the elongated element is an insert, the latter has advantageously a main hollow body and a collar placed at least at one end of this hollow body which extends outwardly. When the insert comprises at its free ends such collars, the latter define with the outer wall of this hollow body, a housing intended to retain the surrounding zone of the woven structure in order to ensure as such a blocking in position of the insert into this woven structure. The collars then bear against, or lean on, this surrounding zone of the woven structure.

Moreover, an elongated element that has the shape of a tube can receive an external object.

When furthermore, at least one portion of the inner wall of this tube is tapped, this external object can advantageously be locked into position. Such an external object can then be an insert, a fastening device or a measuring device for example.

Advantageously, this external object can then comprise at least one friction zone, grooved, threaded or other, on at least one portion of its connection zone intended to be in contact with the inner wall of the tube, with this friction zone making it possible to prevent the extraction of this external object under the effect of the pressure of the fluid.

Preferably, this elongated element can be separated in such a way that passing through the woven structure, it is, for example, possible to separate the two walls of this woven structure connected by such an elongated element.

By way of example, such an elongated element can then be used in order to maintain the woven structure compact before its final use.

For the purposes of illustration, an element that can be separated is obtained by assembling a first longitudinal element, hollow or solid, and a second hollow longitudinal element or which has a longitudinal cavity in order to receive at least partially this first element, with the latter being mobile in relation to second longitudinal element and able to be separated from the latter. Alternatively, this elongated element can also be a thread or a tube that has at least one fragile zone in order to ensure its separation into one or several predefined pieces when a breaking force is applied to the latter. This fragile zone can for example be formed by a line of least resistance. In the case of an elongated tube, the latter can as such comprise a set of fracture initiation holes spaced apart from one another and placed on the periphery of this tube in order to define this line of least resistance. In the case of a metal thread, the latter can as such comprise a circular groove that defines a line of separation.

It is clear that this invention is not limited to a particular type of thread but the term "thread" must be understood in its widest acceptance in the textile field.

Solely for the purposes of information, the warp and weft threads implemented in order to carry out this woven structure are chosen from the group comprising single-filament threads, multi-filament threads, flat threads, threads formed of fibres maintained together via twisting, simple or rotor thread, braids of twisted threads, flexible multi-strand elements, whether or not twisted, such as flexible strands.

These threads that comprise the woven structure can be identical or on the contrary, be different for at least some of them. They can also have different thicknesses or diameters.

By way of example, these threads can be chosen from the group comprising threads of organic material such as cotton, wool, linen, or other; synthetic threads such as polyester, polyamide, polypropylene, polyethylene, polyaramide, etc.; threads made from materials with a plastic starch-based biodegradable base or from oxodegradable plastic materials; from inorganic material threads such as carbon, graphite, glass, asbestos or other; and metal threads such as steel, aluminium, alloys or other.

The invention includes the possibility of using several different materials in the carrying out of this woven structure or on the contrary, to carry out a woven structure made of the same single material.

In the case where this woven structure comprises a single wall or in the case where each wall of the woven structure has the same weave, the method for producing a woven structure of this invention can be defined as follows:

Method for producing a woven structure comprising at least one woven wall wherein the following successive steps are carried out:

a) weaving at least one first portion of said woven structure, said first portion comprising warp threads and weft threads intertwined according to a fundamental weave, b) stopping the introduction of the weft threads after the insertion of a weft thread associated with the positioning of at least one elongated element in said woven structure, with this weft thread being intertwined with the warp threads according to this fundamental weave, c) said at least one elongated element having a main axis, introducing each elongated element between the warp threads defining with the associated said weft thread, the insertion position of this element into the woven structure, with the main axis of said elongated element cutting the plane passing through the warp threads of each portion of wall of this first portion into which it is introduced, d) maintaining in position said at least one elongated element and introducing at least one new weft thread intertwining the warp threads of said woven structure according to the fundamental weave or according to a new weave, in order to resume the production of said woven structure, with each elongated element not being taken in said woven structure.

In other words, said at least one elongated element is not linked by the weaving operations to said woven structure but can be assembled with the latter, or made integral with the latter by an operation separate from the weaving, such as gluing or other.

In this way, carrying out the woven structure only by weaving leaves each elongated element in this woven structure free. It is as such possible to withdraw them, or to extract them from the latter.

In different particular embodiments of this method of weaving, with each one having its particular advantages and likely to have many technically admissible combinations:

at the end of the step c), the main axis of each elongated element is perpendicular, or substantially perpendicular, to the plane passing through the warp threads of each portion of wall into which it is introduced, several elongated elements are introduced along the same weft thread of the woven structure.

A single elongated element is introduced into the woven structure at the point of the coordinates (x, y) in a marking linked to a wall of this woven structure. Alternatively, several elongated elements are introduced simultaneously at the same point of the woven structure.

as several elongated elements are introduced along the same warp thread, steps b) to d) are repeated.

These elongated elements can be regularly spaced from one another or not.

These elongated elements can also be arranged in order to form one or several patterns such as a star, a circle, triangle, parallelepiped such as a square or rectangle, as a helix when the woven structure has a tubular three-dimensional shape.

this woven structure comprising at least two woven walls, said elongated element or at least one of said elongated elements passes through at least two walls, said woven wall comprising at least two woven walls and elongated elements being introduced into separate walls, at least some of the latter are placed opposite each other, after the step d), a tightening of the weft threads in the woven structure carried out as such is provoked, said at least one elongated element being as such imprisoned between two consecutive weft threads in the lengthwise direction of the woven structure, the portions of each elongated element which are placed protruding from said woven structure are cut in such a way that the ends of each elongated element shortened as such are placed below, or flush with, the corresponding external surface of said woven structure.

In the case where these ends are flush, it is also said that they are placed level with the corresponding external surface of this woven structure. Prior to this cutting, a layer of polymer can be fixed on at least the two external faces of the woven structure, for example by any method of polymer over-moulding (vulcanisation, coating, etc.).

Carrying out such layers of polymer provides this woven structure, not only with a better seal, but also greater resistance to external aggressions such as objects that can cut and deteriorate this structure.

Advantageously, this polymer is an elastomer.

said or at least one of said elongated elements is assembled to the woven structure.

Preferably, said or at least one of said elongated elements is impregnated beforehand with an adhesive or with a thermosetting resin in order to ensure its fastening to said woven structure.

Alternatively or in addition, each elongated element is chosen or is formed beforehand in such a way that its external surface has a surface relief in order to ensure the maintaining of it in position in said woven structure.

in the steps c) and d), said at least one elongated element is stretched in order to ensure that the entire said elongated element placed in said structure is straight.

By placing the elongated element under tension, it is as such ensured that it retains its geometry. For example, the interior channel of a tube is not accidentally pinched, and consequently closed.

a three-dimensional woven structure is formed from a single piece.

This woven structure is therefore devoid of assembling elements for example points of stitching, staples or other. For the purposes of illustration, such a woven structure is shown in patent application WO2009095404 in the name of this applicant, carrying out a woven structure that has the shape of a hollow tube, elongated elements are integrated into said woven structure by being aligned on the periphery of said tube in order to form at least one circumferential line or a helix.

These elongated elements can form at least two circumferential lines spaced apart from one another in order to allow for the introduction of a thread inside the hollow tube and the exiting of it at another point. As the thread is free between these two points, it can advantageously receive a part such as a rigid ring for its fastening.

said elongated element is a solid thread, a metal thread, an insert, a stiffening rod, a tube, a tube provided with at least one cross-flow sealing membrane, a tube of which the inner wall is tapped and combinations of these elements.

said elongated element being a tube, into the interior channel of said tube, either beforehand, or after the introduction of said into said woven structure during its weaving, is introduced a measuring device, a sensor provided with a transmitting/receiving element, an electrode, a fastening member, a thread, a data storage device, an identification element such as an RFID chip, an electronic unit for receiving and processing the data measured by other sensors, and combinations of these elements.

Solely for the purposes of information, this can be a pressure sensor, a temperature sensor or a humidity sensor. For example, this can be a device for measuring the temperature/humidity of the layer of air located between the body of the user and the inner surface of a piece of clothing wherein one or several tubes are integrated. These tubes can receive electrodes in order to measure the heart rate of a user, an electronic unit for processing measurements, etc.

at least some electricity-conducting threads and/or light-conducting threads, such as optical fibres, are introduced in order to form the warp and/or weft threads in such a way as to define an electrical supply circuit and/or a data transmission circuit in said woven structure.

With such an electrical supply circuit being connected to an external source of power, it is possible to power an external element added to an elongated element.

By way of example, as this elongated element is a support conformed to receive a light source such as a bulb, this electrical power circuit can be used to power this light source.

Alternatively, this elongated element can be conformed to receive an optical device such as a camera. Conducting threads can then be used to supply with energy this optical device and other conducting threads are used to transport the signal measured to a storage unit or to an analysis unit.

Of course, these conducting threads are advantageously insulated by an outer core made from a flexible insulating material.

This invention also relates to a piece of smart clothing of which at least one portion of the latter is a woven structure such as described hereinabove.

This piece of smart clothing can be a piece of medical monitoring clothing for a patient, comprising for example biomedical sensors and a supply of power with electrical energy connected to these sensors by electricity-conducting threads.

Preferably, at least some of said elongated elements of this woven structure comprise a means of anchoring an external object.

As this elongated element is a tube, such a means of anchoring is for example a tapped portion of the inner surface of this tube.

Furthermore, an insert can be added and anchored in an elongated element, with this insert comprising at its free end a fastening device for an external object. This fastening device can for example be a ring.

This external object can be a key ring, a support for a pair of handcuffs or a manual device for defence such as a device for spraying a gas such as pepper spray. Such a support is then advantageously anchored in a set of several elongated elements.

Such a piece of clothing has applications in the military field, surveillance pertaining to security, sports, etc.

This invention further relates to a shaft or hollow duct of which at least one portion is a woven structure such as described hereinabove.

Such a shaft or hollow duct can be used in various applications such as the transport of fluid (gas, liquid such as water).

The elongated elements passing through the wall of this shaft or duct, can for example receive measurement sensors (flow rate, pressure, etc.).

In order to seal this duct, it is possible to fix a layer of polymer onto the external surface and/or the inner surface of this duct as described hereinabove. This polymer can be an elastomer (Nitrile, etc.), polyvinyl chloride (PVC), etc.

This invention also relates to a device for farming seashell such as oysters, comprising at least one element forming a support plate of said seashell intended to be received inside a net of tubular shape.

According to the invention, at least a portion of this net is formed by a woven structure such as described hereinabove.

Such a net has of course openwork in order to ensure the circulation of marine currents around and in the device for farming.

For the purposes of illustration, this element forming a plate comprises a peripheral skirt extending perpendicularly or substantially perpendicularly to the plane of the plate, with this device comprising members for assembling the net with this skirt in such a way that said net is at least partially thrust against this skirt.

Preferably, this element forming a plate comprises a support comprising an annular portion that delimits an opening in the central portion of this support and said peripheral skirt which extends perpendicularly or substantially perpendicular starting from this annular portion, and a removable plate intended to rest on this annular portion by covering said opening.

This removable plate has openwork in order to allow for good circulation of the sea water.

At least the upper end of this device for farming comprises at least one fastening device in order to make it possible to suspend this device for farming vertically from a hawser anchored at sea.

Preferably, this net comprises elongated elements which are aligned or substantially aligned on the periphery of the latter in order to form one or several circumferential lines for assembly opposite each one of which is placed a peripheral skirt of an element forming a plate for the assembly of the element forming a plate and of said net.

Preferably, this assembly is not permanent.

Although the assembly can be carried out in several ways, for example via connection with thread, the elongated elements can be tubes into which are introduced fastening devices in order to ensure the assembly of the element forming a plate and of the net.

By way of example, such a fastening device comprises a portion having a rounded shape in order to exteriorly hug and thrust the net against the peripheral skirt of this plate and at least one protruding element such as a tenon, of which the length and the diameter authorise, once each tenon is introduced into a corresponding elongated element, here a tube, to pass through the latter and an opening of the peripheral skirt for the purpose of assembling them. The end of each tenon can comprise a retaining element forming a protrusion of the main body of the tenon, this end being split in order to define two wings mobile in relation to one another. As such these wings come closer together during the introduction of the tenon into the elongated element and spread apart in blocking position after having passed through this elongated element and the corresponding orifice of the peripheral skirt of the element forming a plate. A force of traction exerted on the fastening device forces the two wings to come together in order to allow for the clearing of the fastening device from the elongated element/orifice unit of the peripheral skirt in order to release the net of the element forming a plate.

This invention further relates to a machine for the production of a woven structure such as described hereinabove, this machine comprising a weaving area in which are inserted into at least one channel, weft threads, each one of said weft threads being inserted between at least two warp threads by at least one weft insertion element, means for managing said or one of said channels and determining the position of said warp threads with respect to said weft thread.

According to the invention, this comprises at least one device for gripping one or several elongated elements and means for displacing this device for gripping outside of and in the weaving zone in order to bring and place one or several elongated elements in position in said woven structure during production.

Advantageously, this device for gripping is configured to make it possible to vary the angle of inclination of the main axis of each elongated element in relation to the plane passing through the warp threads of at least one of the channels.

Preferably, each elongated element is introduced perpendicularly or substantially perpendicularly with respect to said plane.

Advantageously, this machine comprises a cutting tool for cutting the portions of the elongated elements extending beyond said woven structure during production.

BRIEF DESCRIPTION OF THE DRAWINGS

Other advantages, purposes and particular characteristics of this invention shall appear in the following description, made, for the purposes of information and in no way limiting, with regards to the annexed drawings, wherein.

DETAILED DESCRIPTION OF AN EMBODIMENT OF THE INVENTION

First of all, note that the figures are not to scale.

FIGS. 1 to 5 diagrammatically show a device for farming seashell such as oysters, according to a preferred embodiment of this invention.

Such a device 10 for the farming of seashell is intended to be suspended from a hawser immersed at a shallow depth in the open sea by being arranged vertically.

This device 10 comprises a net 11 that has a tubular shape and elements forming a plate cooperating with this net 11 in order to constitute closed supports, regularly spaced along the main axis of this device 10 and extending perpendicularly to the latter in order to receive the seashell to be farmed.

Figure 1:
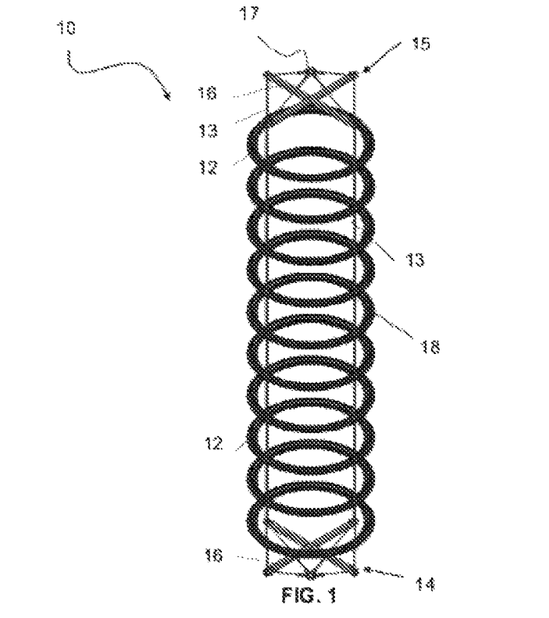
FIG. 1 diagrammatically and as a profile shows a device for farming seashell according to a particular embodiment of this invention, the net and the removable plates of this device for farming have been omitted for purposes of clarity.
Figure 2:
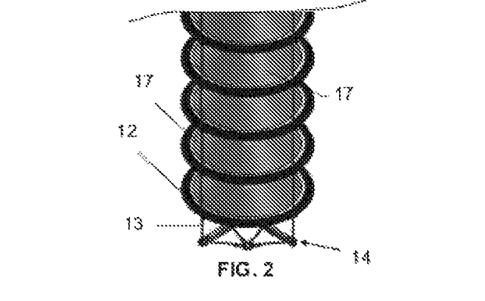
FIG. 2 is a partial view of the device for farming seashell of FIG. 1, with only the net having been removed for purposes of clarity.

Each plate element comprises a ring 12 connected by ends 13 on the one hand, to the rings 12 of the other plate elements of the device for farming and on the other hand, to lower 14 and upper 15 force-absorbing elements.

These force-absorbing elements 14, 15 of the device for farming are here constituted of crosses made more preferably from stainless steel.

The free end of each branch 16 of a force-absorbing element 14, 15 has an orifice for the passing of an end 13.

These ends 13, here in the number of four (4) are regularly distributed on the periphery of the device for farming. These ends 13 are assembled together by each one of their ends thanks to fastening devices 17 such as rings, also ensuring the fastening of the device for farming seashell to the hawser in its upper portion on the one hand, and to a lest in its lower portion on the other hand.

Between the force-absorbing elements 14, 15, these ends 13 extend vertically by being stretched and by being assembled to each ring 12 of the elements forming a plate in order to ensure the attaching and maintaining in position.

Figure 3:
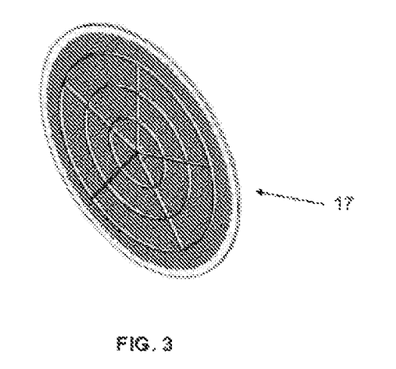
FIG. 3 is a perspective view of a movable plate of the device for farming seashell of FIG. 1.
Figure 4:
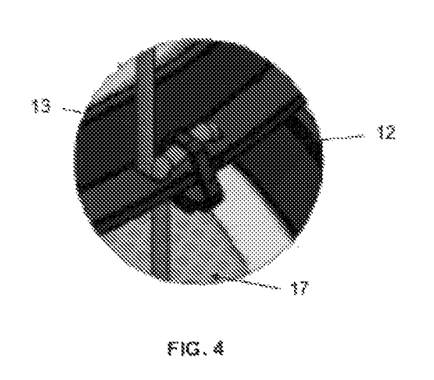
FIG. 4 is an enlarged and partial view of one of the plates of the device for farming seashell showing the assembly of the plate support on the structure of the device for farming of FIG. 1.

Each ring 12 defines a central open portion of the element forming a plate wherein is placed a removable plate 18. This removable plate 18 with an outer diameter less than that of the ring 12 is received in a housing of this plate, with this housing being defined by an inner circular groove 18.

This removable plate 18 received as such in its housing closes the opening delimited by the corresponding ring 12.

Each removable plate 18 has openwork in order to allow for good circulation of the sea water. It can be made from a plastic material and comprise a central folding line in order to facilitate the collection of the seashell.

Such a removable plate 18 allows for facilitated emptying/reloading operations of the devices for the farming of seashell as the latter can remain at sea, with only the removable plates being withdrawn after removal from the net 11.

Figure 5:
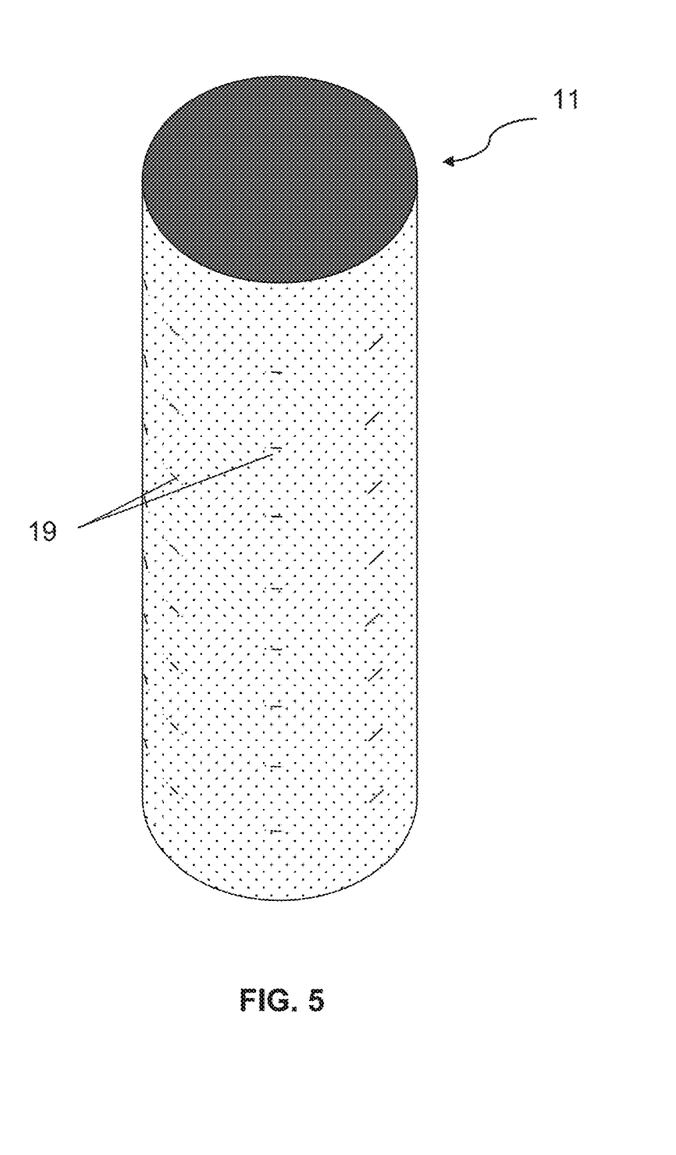
FIG. 5 is a perspective view of the net of the device for farming seashell of FIG. 1.

Such a net 11 of course has openwork in order to ensure the circulation of marine currents around and in the device for farming.

Optimum exposure of the seashell resting on the element forming a plate to the circulation of sea water is thus ensured, which favours their growth while preventing losses of seashell during growth.

This net 11 which is flexible in such a way as to be able to be raised easily in the upper portion of the device in order to access the elements forming a plate, comprises tubes 19 introduced during this net 11 during its weaving.

Each tube 19 is advantageously introduced into the woven structure of the net perpendicularly or substantially perpendicularly in such a way that it is easy to assemble the net 11 with each element forming a plate.

By way of example, these tubes 19 can be made from stainless steel or from a plastic material.

In addition, these tubes 19 are aligned or substantially aligned on the periphery of this net 11 by defining several circumferential lines for assembly that are regularly spaced from one another and perpendicular to the main axis of the net 11.

Each circumferential line for assembly is intended to come opposite an element forming a plate for the purposes of the assembly of this element with the corresponding net 11.

Such an assembly must be able to be released easily in such a way as to facilitate the emptying and reloading operations of the device for farming seashell.

Although the assembly can be carried out in various ways, a fastening device is used here (not shown) comprising a rod intended to be introduced into the interior channel of a tube 19 and of which its length allows it to pass through this tube 19, and consequently the wall of the net 11 in such a way that its threaded end is assembled in a lateral tapped hole of a ring 12. This fastening device also comprises a wide head for its manipulation by an operator and to ensure a thrusting against the ring 12 of the net 11.

The invention claimed is:

1. Method for producing a woven structure comprising at least one woven wall, wherein the following steps are carried out:
    a) weaving at least one first portion of said woven structure, said first portion comprising warp threads and weft threads intertwined according to the fundamental weave of each portion of woven wall corresponding to this first portion,
    b) stopping the introduction of the weft threads after the insertion of a weft thread associated with the positioning of at least one elongated element in said woven structure, with this weft thread being intertwined with the warp threads of each portion of woven wall according to the fundamental weave of said portion of wall,
    c) said at least one elongated element having a longitudinal axis, introducing each elongated element between the warp threads defining with the associated said weft thread, the position of insertion of this elongated element into the woven structure, with the longitudinal axis of said elongated element cutting the plane parallel to the warp threads of each portion of wall into which said elongated element is introduced,
    d) maintaining in position each elongated element and introducing at least one new weft thread intertwining the warp threads of said woven structure according to said fundamental weave of each portion of wall or according to at least one new weave, in order to resume the production of said woven structure; and with each elongated element not being taken in said woven structure.

2. Method according to claim 1, wherein at the end of the step c), the longitudinal axis of each elongated element is perpendicular, or substantially perpendicular, to the plane passing through the warp threads of each portion of wall into which it is introduced.

3. Method according to claim 1, wherein several elongated elements are introduced along the same weft thread of the woven structure.

4. Method according to several elongated elements being introduced along the same warp thread, the steps b) to d) are repeated.

5. Method according to claim 1, wherein said woven structure comprising at least two woven walls, said elongated element or at least one of said elongated elements traverse at least two walls.

6. Method according to claim 1, wherein said woven wall comprising at least two woven walls and elongated elements being introduced into separate walls, at least some of the latter are placed opposite each other.

7. Method according to claim 1, wherein after the step d), a tightening of the weft threads is provoked in the woven structure carried out as such, said at least one elongated element as such being imprisoned between two consecutive weft threads in the lengthwise direction of the woven structure.

8. Method according to claim 1, wherein the portions of each elongated element which are placed protruding from said woven structure are cut in such a way that the ends of each elongated element shortened as such are placed below, or flush with, the corresponding external surface of said woven structure.

9. Method according to claim 1, wherein said or at least one of said elongated elements is assembled to the woven structure.

10. Method according to claim 9, wherein said or at least one of said elongated elements is impregnated beforehand with an adhesive or with a thermosetting resin in order to ensure its fastening to said woven structure.

11. Method according to claim 9, wherein each elongated element is chosen or is formed beforehand in such a way that its external surface has a surface relief in order to ensure the maintaining of it in position in said woven structure.

12. Method according to claim 1, wherein in the steps c) and d), said at least one elongated element is stretched in order to ensure that the entire said elongated element placed in said structure is straight.

13. Method according to claim 1, wherein a three-dimensional woven structure is formed from a single piece.

14. Method according to claim 1, wherein carrying out a woven structure that has the shape of a hollow tube, elongated elements are integrated into said woven structure by being aligned on the periphery of said tube in order to form at least one circumferential line or a helix.

15. Method according to claim 1, wherein said elongated element is a solid wire, a metal thread, an insert, a stiffening rod, a tube, a tube provided with at least one cross-flow sealing membrane, a tube of which the inner wall is tapped and combinations of these elements.

16. Method according to claim 1, wherein said elongated element being a tube, into the interior channel of said tube, either beforehand, or after the introduction of said tube into said woven structure during its weaving, is introduced a measuring device, a sensor provided with a transmitting/receiving element, an electrode, a fastening member, a thread, a data storage device, an identification element such as an RFID chip, an electronic unit for receiving and processing the data measured by other sensors, and combinations of these elements.

17. Method according to claim 1, wherein at least some electricity-conducting threads and/or light-conducting threads are introduced in order to form the warp and/or weft threads in such a way as to define an electrical supply circuit and/or a data transmission circuit in said woven structure.

18. Smart clothing of which at least one portion is a woven structure according to claim 1.

19. Shaft or hollow duct of which at least one portion is constituted by a woven structure according to claim 1.

20. Device for farming seashell such as oysters, comprising at least one element forming a support plate of said seashell intended to be received inside a net of tubular shape, characterised in that at least a portion of said net is formed by a woven structure according to claim 1.

21. Machine for producing a woven structure according to claim 1, comprising a weaving area in which are introduced into at least one channel, weft threads, each one of said weft threads being inserted between at least two warp threads by at least one weft insertion element, means for managing said or one of said channels and determining the position of said warp threads with respect to said weft thread, characterised in that it comprises at least one device for gripping of one or several elongated elements and means for displacing this device for gripping outside of and in the weaving zone in order to bring and place one or several elongated elements in position in said woven structure during production.

22. Machine according to claim 21, wherein said device for gripping is configured to make it possible to vary the angle of inclination of the longitudinal axis of each elongated element with respect to the plane passing through the warp threads of at least one of said channels.

* * * * *